US012620912B2

(12) United States Patent
Schiedermeier

(10) Patent No.: US 12,620,912 B2
(45) Date of Patent: May 5, 2026

(54) ELECTRIC CIRCUIT ARRANGEMENT, ELECTRIC DRIVE DEVICE, MOTOR VEHICLE AND METHOD FOR OPERATING AN ELECTRIC CIRCUIT ARRANGEMENT

(71) Applicant: AUDI AG, Ingolstadt (DE)

(72) Inventor: Maximilian Schiedermeier, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 349 days.

(21) Appl. No.: 18/300,284

(22) Filed: Apr. 13, 2023

(65) Prior Publication Data

US 2023/0336094 A1      Oct. 19, 2023

(30) Foreign Application Priority Data

Apr. 14, 2022    (DE) .......................... 102022109285.2

(51) Int. Cl.
| | |
|---|---|
| *H02M 7/5387* | (2007.01) |
| *B60L 53/22* | (2019.01) |
| *H02M 1/00* | (2007.01) |
| *H02M 1/08* | (2006.01) |
| *H02M 1/32* | (2007.01) |

(52) U.S. Cl.
CPC ........... *H02M 7/5387* (2013.01); *B60L 53/22* (2019.02); *H02M 1/0009* (2021.05); *H02M 1/0045* (2021.05); *H02M 1/08* (2013.01); *H02M 1/322* (2021.05); *H02J 2207/20* (2020.01)

(58) Field of Classification Search
CPC ...... H02M 1/08; H02M 1/322; H02M 7/5387; H02M 1/0009; H03K 17/00; H02P 29/024; H02P 27/06; B60L 53/22; H02J 2207/20

USPC .......................................... 363/131; 323/289
See application file for complete search history.

(56) References Cited

U.S. PATENT DOCUMENTS

| | | | |
|---|---|---|---|
| 8,432,715 | B2 | 4/2013 | Fukuta et al. |
| 9,350,229 | B2 | 5/2016 | Aldinger et al. |
| 10,384,561 | B2 | 8/2019 | Yang et al. |
| | | (Continued) | |

FOREIGN PATENT DOCUMENTS

| | | |
|---|---|---|
| CN | 107196546 A | 9/2017 |
| DE | 102011083945 A1 | 4/2013 |
| | (Continued) | |

*Primary Examiner* — Thienvu V Tran
*Assistant Examiner* — Lauren Ashley Shaw
(74) *Attorney, Agent, or Firm* — Seed Intellectual Property Law Group LLP

(57) ABSTRACT

An electric circuit arrangement includes at least one half bridge including two power switching elements, two driver circuits, and a discharge control circuit, wherein the half bridge is in parallel with an energy accumulator and each power switching element has a switchable section with an electric resistance that is adjustable by a control voltage at a control input of the power switching element, while in a normal operation of the power switching elements, the drivers circuits generates the control voltage at the control input of each power switching element, and, while in at least one discharge operation that discharges the energy accumulator, the discharge control circuit generates a discharge voltage as the control voltage as the control input of at least one of the power switching elements, the discharge voltage placing the at least one of the power switching elements in linear operation.

15 Claims, 3 Drawing Sheets

(56) References Cited

U.S. PATENT DOCUMENTS

2004/0051509 A1* 3/2004 Matsuo ................. H02M 3/156
                                                         323/282
2014/0333246 A1* 11/2014 Eberlein ............. H02M 7/5387
                                                         318/400.27

FOREIGN PATENT DOCUMENTS

DE      102014202717 B3    6/2015
DE      102017121579 A1    3/2018

* cited by examiner

ELECTRIC CIRCUIT ARRANGEMENT, ELECTRIC DRIVE DEVICE, MOTOR VEHICLE AND METHOD FOR OPERATING AN ELECTRIC CIRCUIT ARRANGEMENT

BACKGROUND

Technical Field

The disclosure relates to an electric circuit arrangement, comprising at least one half bridge composed of two power switching elements and two driver circuits, wherein the half bridge is or can be hooked up in parallel with at least one energy accumulator and the power switching elements each have a switchable section, the electric resistance of which can be adjusted by a control voltage of the power switching element which is imposed at a control input of the power switching element, while in a normal operation of the power switching elements the control voltage can be generated each time across a driver circuit of the power switching element. In addition, the disclosure relates to an electric drive device, a motor vehicle and a method for operating an electric circuit arrangement.

Description of the Related Art

In the field of electrification of vehicles, especially electromobility, electric machines, usually rotary-field electric machines, are used as drive devices for vehicles, such as motor vehicles like electric motor vehicles or hybrid motor vehicles. For example, permanently excited synchronous machines, externally excited synchronous machines and/or asynchronous machines can be used. In the corresponding drive device, the electric circuit arrangement used is typically an inverter, especially a multiphase inverter, which can actuate the electric machine. The inverter can be understood as being a connecting link between the DC voltage side, represented especially by a high-voltage battery, and the alternating current side, represented especially by the electric machine.

One component of such inverters is usually also an energy accumulator, which can support the DC voltage on the inverter and which is designed for example as an intermediate circuit capacitor. In this way, the intermediate circuit capacitor can also perform the additional task of filtering signals on the high voltage, direct current side of the inverter. For safety reasons, the voltage of the intermediate circuit capacitor or an energy accumulator in general must be discharged upon ending an operational phase, such as the switching off of the motor vehicle, and/or in critical situations (active discharging). Due to the large capacitance of such energy accumulators and the high voltage, high electric energy may be present, so that dedicated discharge circuits or their discharge elements, especially discharge resistors, may be large and expensive. For example, it has been proposed to actively discharge the energy accumulator across a discharge resistance and a semiconductor switch. This involves both high costs and a significant consumption of design space. Furthermore, the discharge resistances themselves and any other nearby components become heavily heated.

Electric Circuit arrangements such as the mentioned inverters moreover also usually comprise at least one half bridge on the alternating current side, especially a number of half bridges corresponding to the number of phases. Half bridges usually have power switching elements, such as IGBTs and/or MOSFETs, which can be switched between an open and a closed state by way of an associated driver circuit, by applying a corresponding control voltage at a control input (gate input). However, the power switching elements, which are usually designed as semiconductor switches, as mentioned, can also only be operated basically in a so-called linear region, in which a resistance can be set by the control voltage at the control input. It has already been proposed in the prior art to use this linear region for desired discharge processes during the normal operation.

In this regard, DE 10 2014 202 717 B3 discloses a system with a control regulator, an inverter, an intermediate circuit capacitor, which is coupled to input terminals of the inverter, at least one temperature sensor, which is designed to determine a temperature change of the semiconductor switches of the half bridge of the inverter, and a voltage sensor, which is designed to determine the voltage on the intermediate circuit capacitor. The control device is designed to trigger the semiconductor switches based on a control signal of the control regulator. The control signal is generated as a series of control signal pulses with an adjustable pulse length, so that the semiconductor switches of the half bridge of the inverter are not fully conductive during the pulse length upon actuation by the control signal, so that a current capacitance of the intermediate circuit capacitor can be calculated based on a detected temperature change of the temperature sensor and a detected voltage change of the voltage sensor during the actuating of the semiconductor switches.

DE 10 2017 121 579 A1 relates to an active discharge circuit for an intermediate circuit capacitor making use of phase branch switches, where a discharging can occur in a drive system for an electric motor vehicle by using only local measures within an inverter module and without any additional components. It is proposed to use gate drivers, which are coupled to phase branches, in order to switch upper and lower switching devices of a half bridge to transitional states at the same time, ensuring that the switching devices provide an impedance which drains the capacitor line while the devices are protected against excessive temperatures. IGBTs can be pulse width modulated according to an algorithm, driving a flow-weakening current resulting in no torque being present, while the charge on the capacitor is drained.

CN 107196546 A discloses an active discharge system of a motor controller, wherein the driver modules of an upper bridge arm are actuated during active discharging to switch semiconductor switches into a closed state, while semiconductor switches of a lower bridge arm are switched to a linear region by lower driver voltages of the driver modules in order to provide a certain resistance. The actuating of the semiconductor switches of the lower bridge arm via the driver modules likewise occurs by pulse width modulation.

Therefore, embodiments of the disclosure provide a more economical, robust, and easily implemented possibility of active discharging of an energy accumulator, especially an intermediate circuit capacitor.

BRIEF SUMMARY

As a solution for an electric circuit arrangement of the kind mentioned above, it is proposed according to the disclosure that the circuit arrangement moreover comprises a discharge control circuit, while in at least one discharge operation for the discharging of the energy accumulator by the discharge control circuit for at least one of the power switching elements a discharge voltage placing the power switching element in a linear operation can be generated as the control voltage.

Thus, if the energy accumulator, such as an intermediate circuit capacitor, is to be discharged, it is switched to a discharge operation, as is basically known, for which a discharge control circuit separate from the driver circuits is used according to the present disclosure. In the discharge operation, the driver circuits do not provide a control voltage at the control inputs of at least one of the power switching elements of the half bridge or each half bridge, but instead a discharge voltage is provided as a control voltage by the discharge control circuit for the at least one of the power switching elements, such that the power switching element is placed in a linear operation, and therefore provides a resistance as determined by the discharge voltage. The discharge control circuit in a first embodiment can basically provide the discharge voltage as a control voltage for the linear operation for only one of the power switching elements of the half bridge, while the other power switching element can be switched to the closed, i.e., fully conductive state, which is also possible by way of the driver circuit there. In a second embodiment, the discharge control circuit can provide discharge voltages as the control voltage for the linear operation for both power switching elements, and then none of the driver circuits furnish the control voltages. The discharge operation can generally be controlled by a discharge control device, which will be further explained in the following, which can also deactivate the driver circuits (gate drivers) for the discharge operation to the extent that they no longer furnish any control voltages, but instead discharge voltages are furnished through the discharge control circuit as the control voltages.

By contrast with the prior art, it is therefore proposed to use a separate discharge control circuit, so that development expense and cost expense for a modification of the driver circuits can be avoided. This is relevant, for example, because the discharge control circuit can be realized in a robust and economical manner, which also in particular reduces the testing expense for the safety-relevant function of the active discharging. Moreover, the function of the discharge operation is not dependent on the function of the driver circuits, so that in particular it can also work without pulse width modulation.

Also, in the present disclosure there are the advantages that the discharging of the energy accumulator need not occur across a complex, expensive discharge resistance, but rather it can occur across the at least one half bridge of the electric circuit arrangement. An additional power semiconductor is no longer needed for a dedicated discharge circuit, so that lower costs, less design space, and lower weight are achieved and no heating of nearby circuit parts by the active discharging is to be feared. In an especially advantageous, specific configuration of the discharge control circuit, it can be provided that the discharge control circuit comprises at least one resistance arrangement hooked up in parallel with the control input of at least one of the power switching elements, wherein the resistance arrangement can be switched between several states and different discharge voltages for the power switching element can be generated depending on the state of the resistance arrangement. Resistors are economically produced and robust parts, the use of which is especially advantageous and contributes to a simple configuration of the discharge control circuit. Although it is basically conceivable to provide at least one adjustable resistance as the resistance arrangement, it is advantageous in the context of the disclosure for the resistance arrangement to comprise multiple resistors, each of which can be switched across a resistance switching element parallel to the control input of the power switching element. In this way, it is possible to provide an adjustable resistance value by the resistance arrangement, in which different combinations of the multiple resistors can be organized by means of the resistance switching elements, which can be designed as simple semiconductor switches, especially transistors. The control logic for actuating such resistance switching elements is likewise easy to realize. Both resistance switching elements and resistors are extremely robust and commercially available.

Advisedly, the resistance arrangement can form, with at least one further resistance, a voltage divider, and a power supply voltage generated by a voltage source will drop across the voltage divider. A voltage divider with the resistance arrangement and the further resistance, which has in particular a constant resistance value, constitutes a simple, robust, economically realizable and well-known way of providing an adjustable control voltage as the discharge voltage dropping across the resistance arrangement. In this regard, one advantageous modification proposes that the power supply voltage of the voltage source is also a power supply voltage of the driver circuit. This has the advantage that no additional costs are incurred for the providing of the power supply. Of course, it is alternatively possible for the voltage source to be separate from the voltage source of the driver circuit, thereby assuring greater functional security and fault safety. Here as well, in one embodiment, the redundant use of the voltage source of the driver circuit and an additional voltage source for the discharge control circuit is basically conceivable.

It should also be noted in general that semiconductor switches can be used with special advantage as the power switching elements, especially IGBTs and/or FETs, in particular MOSFETs. The control input of such semiconductor switches usually corresponds to the gate input, and furthermore, as is basically known, a source input and a drain input are provided. In the linear operation, it can be said that the higher the discharge voltage across the gate-source section, the more conducting and the more low-impedance the semiconductor switches are. In the exemplary embodiment of multiple resistors with respective resistance switching elements, it can be said that the more resistance switching elements are closed, the more low-impedance is the path from gate to source of the semiconductor switches and the less discharge voltage drops across it, since more voltage, in terms of the power supply voltage, drops across the further resistance in the voltage divider.

As already mentioned, the discharge control circuit can comprise at least one discharge control device, especially at least one controller, such as a microcontroller, and/or a control circuit containing multiple logic elements. The discharge control device is adapted to set the amplitude of the discharge voltage of the at least one power switching element in dependence on discharge information. For example, the discharge control device in the above given example of the resistance arrangement with multiple resistors and associated resistance switching elements can be designed to set the discharge voltage by switching the resistors of the resistance arrangement, i.e., the actuation of the resistance switching elements. For example, the discharge control device here can be provided by a microcontroller, but it is advantageous to realize a robust and economical implementation of the discharge control device by a control circuit having multiple logic elements, and thus discrete, robust, economically available and easily tested discrete components as the logic elements.

The discharge information can comprise at least one discharge current measured value describing a discharge current of an energy accumulator which is being discharged and/or at least one voltage metering value describing a voltage of the energy accumulator which is being discharged. With special advantage, metering devices already present as part of the electric circuit arrangement will be used. In other words, the available sensors can be utilized. For example, if the electric circuit arrangement is an inverter, especially one for an electric drive device, a measurement of the voltage drop across the energy accumulator, such as an intermediate circuit capacitor, must be done in any case. The determination need not be done by a dedicated metering device provided at the energy accumulator, but rather two voltage metering values each describing the voltage drop across the power switching elements of the half bridges can also be determined, for example by corresponding metering devices, and from these the voltage of the energy accumulator being discharged, and therefore the corresponding voltage metering value, can be determined in particular by forming the sum. In this case, the measurement channels or metering devices for the measurements of the voltage metering values can be assigned to the passive discharging which needs to be provided in any case, for safety reasons, in such electric circuit arrangements, such as inverters, so that such metering devices also can be seen as not being extra devices or extra expense.

The voltage metering value describing the energy accumulator being discharged basically indicates whether a discharging process must (still) be done, and to what extent. The discharge current of the energy accumulator being discharged is a measure of whether the two power switching elements combined are low-impedance enough for a sufficiently fast active discharging. If the dynamics of the active discharging are too little, this can be ascertained in the discharge control device and the discharge voltage can be increased so that the voltage drop increases and the power switching element is made more conducting. For this, the overall resistance value of the resistance arrangement can be increased, for example, by actuating the resistance switching elements. On the other hand, if the dynamics of the discharging are too high, the overall resistance value of the resistance arrangement can be reduced, so that the resistance increases in the linear region. For example, it can be provided in the case of active discharging that an adequate discharging of the energy accumulator, for example to at most 60 V, should occur within not more than 5 seconds, especially not more than 3 seconds.

It should further be mentioned that the discharge current of an energy accumulator being discharged, and therefore the discharge current measured value, need not be measured directly by a current metering device, but instead it is also entirely possible to infer the discharge current from the development over time of the voltage of the energy accumulator being discharged in the discharge control device. The more low-impedance the power switching elements, the faster the voltage breaks down in the energy accumulator, which can be detected and taken into account by the discharge control device.

In an especially advisable embodiment of the present disclosure, it can be provided that the discharge voltages of both power switching elements can be generated by way of the discharge control circuit, and the discharge control device is adapted to set, in a freewheel discharge operation, the discharge voltages in dependence on discharge information, comprising two voltage metering values describing respectively the voltage drop across the power switching elements, especially such that the voltage drops are equally large each time. Voltage metering values of the voltages across the two power switching elements in the context of the voltage of the energy accumulator being discharged are a measure of whether the voltage drops across the two power switching elements are symmetrical. This is especially relevant when an electric machine is connected across the electric circuit arrangement, which can be designed in particular as an inverter, and that machine needs to be switched to a freewheel mode for safety reasons. If a symmetrical division of the voltage drops is realized, the freewheel mode can be achieved as a safe state. This can be achieved by appropriate actuation by means of the discharge control device. If the voltage metering value on one side of the half bridge, such as the lower side, is higher than that on the other side, such as the upper side, the overall resistance value of the resistance arrangement of one side, especially the lower side, may be increased and/or the overall resistance value of the resistance arrangement of the other side of the half bridge, such as the upper side, may be decreased. It is possible to select between the last mentioned possibilities for example depending on the prevailing discharge current through the energy accumulator being discharged.

In the context of the present disclosure the discharge control device can moreover be adapted to generate, in a short circuit discharge operation, the discharge voltage of one of the power switching elements by means of the discharge circuit and to switch the other power switching element to a fully closed state. If an electric machine is connected to the electric circuit arrangement, it is therefore not only possible to set a freewheel state, but also an active short circuit on the electric machine. In this case, one of the two power switching elements is fully closed, either across the corresponding driver circuit or across the discharge control circuit, i.e., it has minimal resistance, while the other power switching element is operated in linear region to provide a certain resistance value by providing a corresponding discharge voltage at the control input. In this context, it should be further mentioned that the implementation of the discharge control circuit, as already explained above, should be done for at least one of the two power switching elements of the half bridge, and when only one power switching element is operated in the linear region the other power switching element should be fully activated, and therefore closed. Although the implementation with only a single power switching element operating in the linear region may be more favorable, the possibility of a freewheel mode for a connected electric machine is attractive when it is possible to provide a discharge voltage for operation in the linear region for both power switching elements.

In this context, an especially advantageous modification of the present disclosure proposes that the discharge control device is adapted to select and carry out the short circuit discharge operation or the freewheel discharge operation at the start of the discharge operation in dependence on machine type information, especially information stored in the discharge control device, which describes a machine type of an electric machine that is connected or can be connected to the electric circuit arrangement. In other words, if a signal is present for switching from the normal operation (or no operation/any other operating mode) to the discharge operation, the machine type information stored in or provided to the discharge control device will at first be evaluated, describing a machine type of an electric machine which is or can be connected to the electric circuit arrangement, in order to determine whether, for safety reasons, this electric machine should be operated in freewheel mode or whether an active short circuit should be produced. The short circuit discharge operation or the freewheel discharge operation will then be carried out as the discharge operation. In this way, the electric circuit arrangement can be produced and used in the same way for different machine types of electric machines, which means that the electric circuit arrangement can set both freewheel and active short circuit (ACS) for the electric machine. The described discharge strategy is therefore also independent of the type of the connected electric machine, such as synchronous machine, asynchronous machine, externally excited synchronous machine and so forth.

Advisedly, as already explained, the energy accumulator can be a capacitor, especially an intermediate circuit capacitor. This is especially advisable when the electric circuit arrangement is designed as a multiphase, especially a three-phase, inverter. In this context, and also in general, it is of special advantage in the case of half bridges for multiple phases to provide discharge control circuits for each of the half bridges (and thus for each of the phases) and to use them in the discharge operation, since then the discharge process is distributed among the different half bridges. The discharge control circuits can have a common discharge control device. A configuration as an inverter with an intermediate circuit capacitor as the energy accumulator is especially advisable in an electric drive device, especially in a motor vehicle.

Hence, the present disclosure also relates to an electric drive device, comprising an electric circuit arrangement of the kind according to the disclosure and an electric machine connected to the electric circuit arrangement. The electric circuit arrangement is, in particular, a three-phase inverter. The electric machine can be, for example, a permanently excited synchronous machine (PSM), an externally excited synchronous machine (FESM), or an asynchronous machine (ASM).

A motor vehicle according to the disclosure comprises an electric circuit arrangement according to the disclosure and/or an electric drive device according to the disclosure. It is often required in motor vehicles, for safety reasons, to perform a discharging of energy accumulators, especially intermediate circuit capacitors, within a given period of time, for example, such as when the motor vehicle or the drive unit is switched off and/or if a fault condition arises. The realization of the discharge operation via the discharge control circuit according to the disclosure is especially suitable for providing this functionality in a robust, economical, and low-cost manner.

Of course, the remarks for the electric circuit arrangement hold accordingly for the electric drive device and the motor vehicle. In particular, if an active short circuit or a freewheel can be set for an electric machine according to the machine type information, the same electric circuit arrangement, especially the same inverter, can be used and provided for motor vehicles with different types of electric machines.

Finally, the disclosure also relates to a method for operating an electric circuit arrangement comprising at least one half bridge composed of two power switching elements, two driver circuits, and a discharge control circuit, wherein the half bridge is or can be hooked up in parallel with at least one energy accumulator and the power switching elements each have a switchable section, the electric resistance of which can be adjusted by a control voltage of the power switching element which is imposed at a control input of the power switching element, while in a normal operation of the power switching elements the control voltage can be generated each time across a driver circuit of the power switching element and in at least one discharge operation for the discharging of the energy accumulator the discharge control circuit for at least one of the power switching elements generates a discharge voltage placing the power switching element in a linear operation as the control voltage. All of the remarks regarding the devices according to the disclosure, especially the electric circuit arrangement according to the disclosure, can also be applied analogously to the method according to the disclosure, so that the benefits already mentioned can also be obtained with this method.

This holds in particular for the use of discharge information, the providing of freewheel and active short circuit at a connected electric machine, and the evaluation of the machine type information.

BRIEF DESCRIPTION OF THE SEVERAL VIEWS OF THE DRAWINGS

Further benefits and details of the present disclosure will emerge from the exemplary embodiments described in the following, as well as with the aid of the drawing. There are shown.

DETAILED DESCRIPTION

Figure 1:
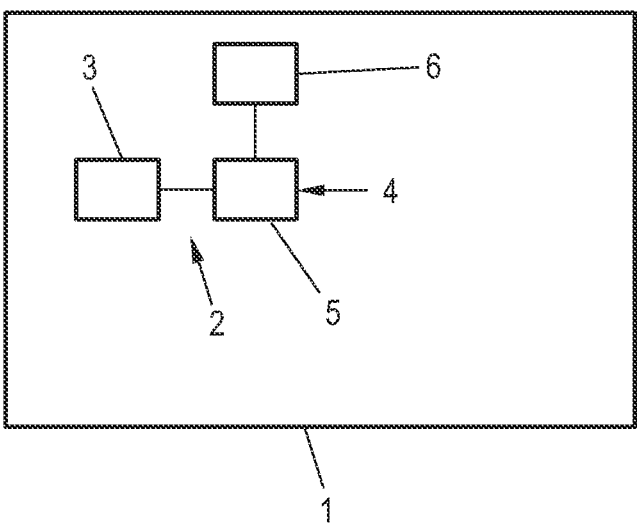
FIG. 1 shows a schematic of a motor vehicle according to the disclosure.

FIG. 1 shows a schematic of a motor vehicle 1 according to the disclosure, here, an electric motor vehicle. The motor vehicle 1 comprises an electric drive device 2 according to the disclosure, having an electric machine 3, such as a permanently excited synchronous machine, an externally excited synchronous machine, or an asynchronous machine, which serves as the traction motor for the motor vehicle 1. The electric machine 3 is connected across an electric circuit arrangement 4 according to the disclosure, being configured in the present case as a three-phase inverter 5, to a direct current, high-voltage network of the motor vehicle 1, especially a high-voltage battery 6.

Figure 2:
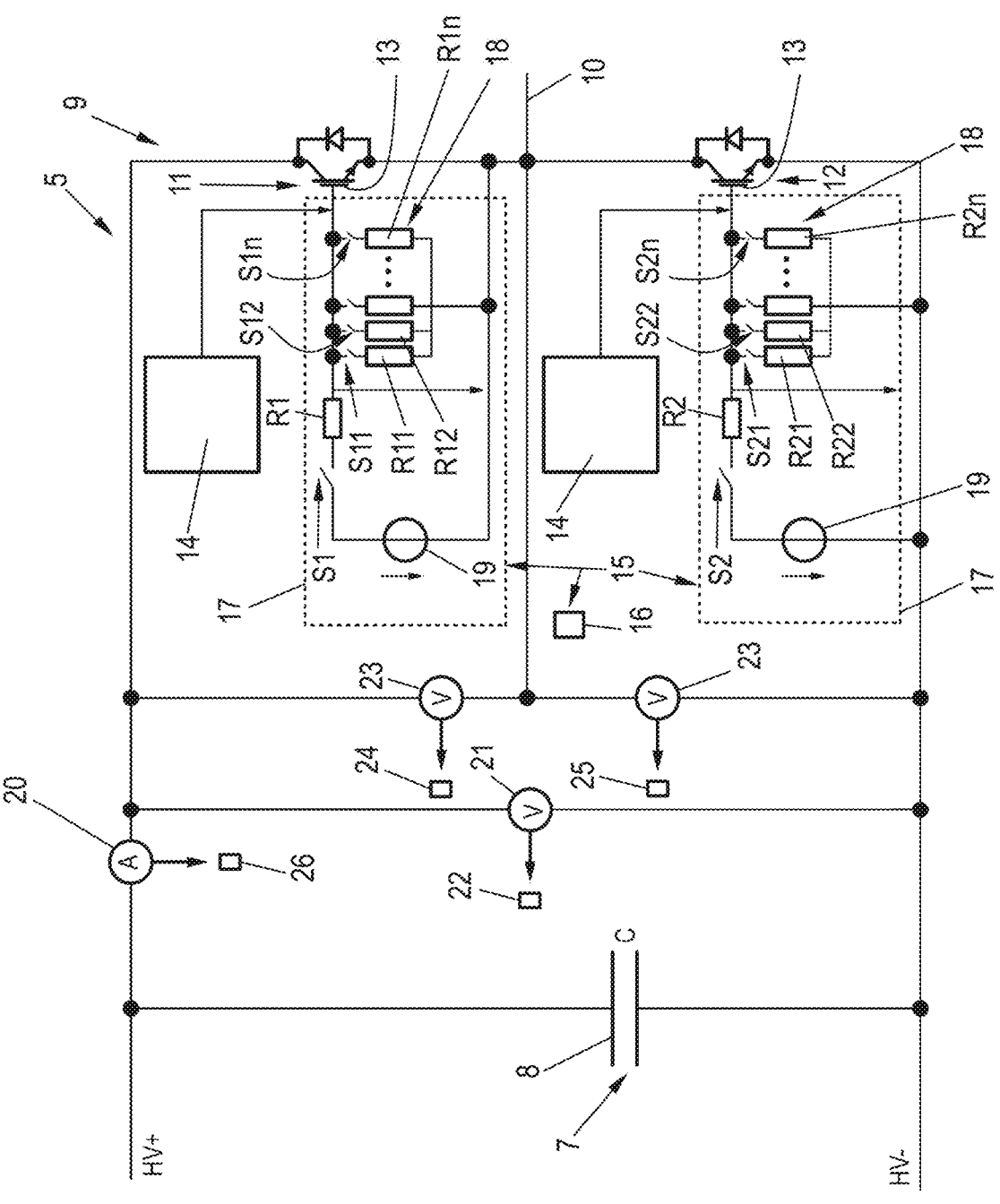
FIG. 2 shows a phase-associated portion of an electric circuit arrangement of the motor vehicle, configured as a three-phase inverter.

FIG. 2 shows more precisely the basic layout of the inverter 5 for one of the phases. The inverter 5 comprises, as the energy accumulator 7, an intermediate circuit capacitor 8, which is connected to corresponding high-voltage potentials HV+, HV− of the direct current, high-voltage network. On the side with the electric machine 3, that is an alternating current side, the inverter 5 comprises half bridges 9 for each of the phases, representing here, as mentioned, only the half bridge 9 for one of the phases, such as the U-phase 10. However, a corresponding layout is also given for the other two half bridges.

Each half bridge 9 comprises two power switching elements 11, 12, which are configured as power semiconductor switches, especially IGBTs or FETs. The power semiconductor switches 11, 12 each have a control input 13 (gate). Here it is possible to apply a control voltage by way of a driver circuit 14, as is basically known, in order to open or close the power switching elements 11, 12.

Separate from the driver circuits 14, the inverter 5 furthermore has a discharge control circuit 15 for discharging the energy accumulator 7 in a discharge operation. While the driver circuits 14 apply control voltages to the respective control inputs 13 for the opening and closing of the power switching elements 11, 12 in a normal operation, the discharge control circuit 15 is designed in the present case to apply discharge voltages in the discharge operation to both power switching elements, specifically their control inputs 13, in order to operate the power switching elements 11, 12 in a linear region, in which the amplitude of the discharge voltage (source-gate voltage) determines the resistance value of the particular power switching element 11, 12. Since different discharge voltages can be realized at the control inputs 13 by way of the discharge control circuit 15, which moreover also comprises a discharge control device 16, the resistance value of the respective power switching elements 11, 12 can therefore be selected.

The discharge control circuit 15 thus has a partial circuit 17 for the upper and the lower part of the half bridge 9, and hence for each power switching element 11, 12, comprising a resistance arrangement 18 with a plurality of resistors R11, R12, . . . , R1*n* and R21, R22, . . . , R2*n*, respectively, each of which is associated with a resistance switching element S11, S12, . . . , S1*n*, or S21, S22, . . . , S2*n*. Thus, by actuating the resistance switching elements S1*i* or S2*i*, i=1 . . . n, different overall resistance values can be set for the resistance arrangements 18.

Since the resistance arrangements 18 together with a further respective resistance R1, R2 form a voltage divider, this setting of the overall resistance value corresponds to a setting of the resulting discharge voltage at the control input 13. Further switching elements S1, S2 are also assigned respectively to the resistors R1 and R2.

The voltage divider in this case divides a power supply voltage generated by a voltage source 19, which in the present case is also the power supply voltage of the driver circuit 14.

Now, if the energy accumulator 7 needs to be discharged, which can be indicated by an externally produced discharge signal, the switches S1 and S2 will be closed. Moreover, controlled by the discharge control device 16, at least one portion of the resistance switching elements S1*i* or S2*i* will be closed. Since the resistors R1*i* and R2*i* are hooked up in parallel, the more resistance switching elements S1*i*, S2*i* are closed, the more low-impedance is the pathway from the control input 13 to the source input of the power switching elements 11, 12, which results in a falling discharge voltage. Thus, the higher the voltage across these gate-source pathways, the higher the discharge voltage, and the more conducting the power switching elements 11, 12 become. This means that the higher the discharge voltage, the lower the resistance value of the power switching elements 11, 12.

Which or how many of the resistance switching elements S1*i* and S2*i* are closed is controlled by the discharge control device 16 in dependence on discharge information, as shall be explained more closely in the following.

In the exemplary embodiment of FIG. 2, the inverter 5 comprises certain metering devices in any case, i.e., for other purposes, being in the present case a current metering device 20 for measuring the discharge current of the energy accumulator 7, a voltage metering device 21 for measuring a voltage metering value 22 describing the voltage of the energy accumulator 7, and voltage metering devices 23 for measuring the voltage metering values 24, 25 describing the voltage drop across the power switching elements 11, 12.

It should be noted that the measurement of the voltage metering value 22 by way of the voltage metering device 21 can also be omitted, since the voltage metering value 22 results immediately as the sum of the voltage values 24 and 25. Neither is it absolutely necessary to include a discharge current measured value 26 describing the discharge current by way of the current metering device 20, since the current flow can also be deduced from the time variation of the voltage metering value 22.

The voltage metering devices 23 are part of a passive discharge arrangement, also provided independently of the discharge control circuit 15, and serving for safety in the inverter 5.

The discharge control device 16 can moreover be realized as at least one microcontroller or another controller, but advantageously the discharge control device 15 should be realized as a control circuit comprising discrete logic elements.

Figure 3:
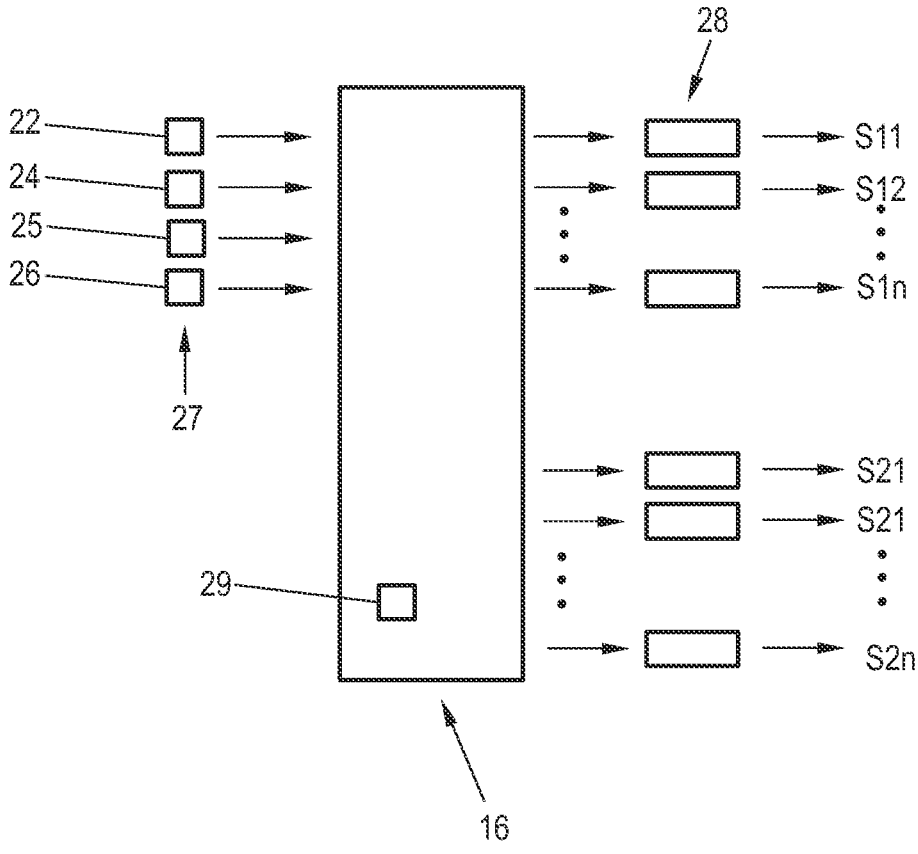
FIG. 3 shows a control principle of the present disclosure.

The discharge information in the present case is the voltage metering values 22, 24 and 25 as well as the discharge current measured value 26. This is also shown schematically once again by FIG. 3, where measured values 22, 24, 25, 26 as the discharge information 27 go into the discharge control device 16, which actuates the switches S1*i* or S2*i* through drivers 28, based on the discharge information 27.

The discharge current measured value 26 is an indication of whether the total resistance value produced by the power switching elements 11, 12 is low enough for the active discharging of the energy accumulator 7 to take place fast enough, for example, to no more than 60 V in less than 5 seconds or even less than 3 seconds or less than 1 second. The necessary discharging in this case is described by the voltage metering value 22. If the dynamics of the discharging is too low, the discharge voltage will be increased at least on one of the power switching elements 11, 12, specifically in the present case by increasing the overall resistance value of the particular resistance arrangement 18, so that the resistance value of the particular power switching element 11, 12 decreases. If the dynamics is too high, for example going beyond a threshold value which indicates a danger of overheating, the discharge voltage can be lowered accordingly.

It should be further mentioned that machine type information 29 has also been stored in the discharge control device 16. The machine type information 29 describes whether to set a freewheel or an active short circuit for the electric machine 3, for safety reasons. The discharge control device 16 is basically designed for both of these. Thus, in a freewheel discharge operation, it can set the discharge voltages in dependence on the discharge information 27, more precisely the voltage metering values 24 and 25, so that the voltage drops across the power switching elements 11, 12 are equally large. A freewheel will then result. In other words, the secure state of a freewheel is achieved in a symmetrical division of the voltage drops (also known as a Six-Switch-Open in the case of three phases). The control operation of the discharge control device 16 then arranges, if the voltage metering value 24, 25 on one side is higher than that on the other side, either to increase the discharge voltage on the one side or to decrease the discharge voltage on the other side, depending on the discharge current measured value 26.

However, a short circuit discharge operation is also possible to provide an active short circuit, where one of the power switching elements 11, 12 is switched to a fully closed state and the other power switching element 12, 11 is set at a certain resistance value by way of a corresponding discharge voltage.

It should be further mentioned that configurations are also conceivable in which a partial circuit 17 can be provided for only one of the power switching elements 11, 12, especially when only a short circuit discharge operation is required in any case. The discharge control device 16 can then be configured to also actuate the driver circuit 14 at the other power switching element 12, 11 for closing the corresponding power switching element 12, 11.

Figure 4:
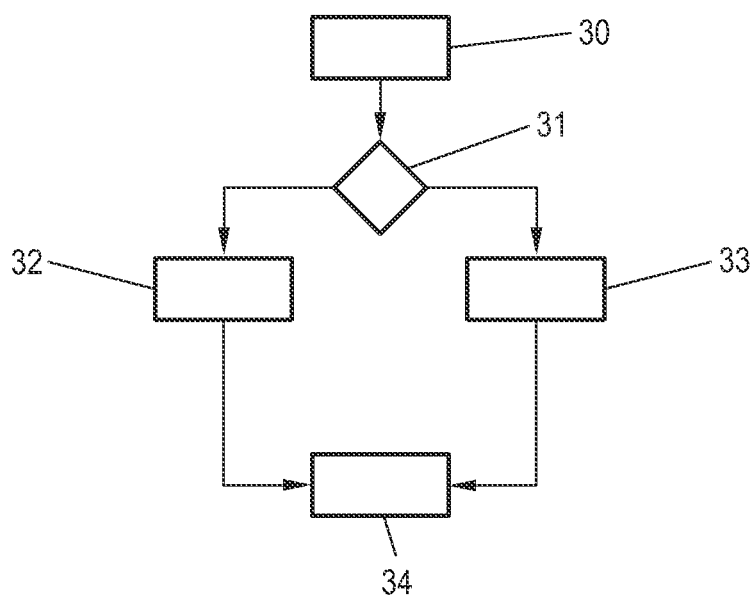
FIG. 4 shows a flow chart of an exemplary embodiment of the method according to the disclosure.

FIG. 4 finally shows a flow chart of an exemplary embodiment of the method according to the disclosure. Here, in step 30, a discharge signal is received, which indicates that the discharge operation is to be activated and the energy accumulator 7 is to be discharged. The discharge control device 16 then evaluates in step 31 the machine type information 29 in order to decide whether to set a freewheel or an active short circuit mode. Depending on this, either the short circuit discharge operation is undertaken in step 32 or the freewheel discharge operation in step 33. While in the freewheel discharge operation discharge voltages are provided at the control inputs 13 for both power switching elements 11, 12 in order to achieve a symmetrical distribution of the voltage drop, in the short circuit discharge operation one of the power switching elements 11, 12 is kept constantly closed and a suitable discharge voltage is provided only at the other one to produce a suitable resistance value in the linear range. The corresponding discharge voltages are set in this case by actuating the resistance switching elements S1i, S2i.

If the energy accumulator 7 is fully or sufficiently discharged, the active discharge process described here ends in step 34.

German patent application no. 102022109285.2, filed Apr. 14, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric circuit arrangement, comprising:
at least one half bridge including two power switching elements and two driver circuits, wherein the at least one half bridge is in parallel with at least one energy accumulator and each power switching element of the power switching elements has a switchable section with an electric resistance that is adjustable by a control voltage at a control input of the power switching element, wherein, while in a normal operation of the power switching elements, the control voltage of each of the power switching elements is generated by the driver circuits; and
a discharge control circuit that is different from the two driver circuits, wherein while in at least one discharge operation that discharges the at least one energy accumulator, the discharge control circuit generates a discharge voltage based on a discharge current of the at least one energy accumulator that is being discharged as the control voltage at the control input of at least one of the power switching elements, the discharge voltage placing the at least one of the power switching elements in linear operation,
wherein the discharge control circuit comprises at least one discharge control device that, in operation, sets an amplitude of the discharge voltage based on discharge information,
wherein the discharge control circuit, in operation, generates discharge voltages of both of the power switching elements, and the discharge control device, in operation, sets, in a freewheel discharge operation, the discharge voltages based on discharge information including two voltage metering values describing respectively a voltage drop across each of the power switching elements, and
wherein the voltage drop across a first one of the power switching elements is equal to the voltage drop across a second one of the power switching elements.

2. The electric circuit arrangement according to claim 1, wherein the discharge control circuit includes at least one resistance arrangement connected in parallel with the control input of the at least one of the power switching elements, and wherein the at least one resistance arrangement is switchable between several states, and different discharge voltages for the at least one of the power switching elements are generated depending on a state of the at least one resistance arrangement.

3. The electric circuit arrangement according to claim 2, wherein the at least one resistance arrangement includes multiple resistors which are switchable across a resistance switching element connected in parallel with the control input of the at least one of the power switching elements.

4. The electric circuit arrangement according to claim 2, wherein the at least one resistance arrangement forms, with at least one further resistance, a voltage divider, and a power supply voltage generated by a voltage source drops across the voltage divider.

5. The electric circuit arrangement according to claim 4, wherein the power supply voltage generated by the voltage source is also a power supply voltage of the driver circuits, or the voltage source is separate from a voltage source of the driver circuits.

6. The electric circuit arrangement according to claim 1, wherein the discharge information includes at least one discharge current measured value describing the discharge current of the at least one energy accumulator that is being discharged or at least one voltage metering value describing a voltage of the energy accumulator which is being discharged.

7. The electric circuit arrangement according to claim 1, wherein the discharge control device, in a short circuit discharge operation, generates the discharge voltage of a first one of the power switching elements and the discharge control circuit, in operation, switches a second one of the power switching elements to a fully closed state.

8. The electric circuit arrangement according to claim 7, wherein the discharge control device, in operation, selects and carries out the short circuit discharge operation or the freewheel discharge operation at a start of the discharge operation based on machine type information that describes a machine type of an electric machine that is connectable to the electric circuit arrangement.

9. The electric circuit arrangement according to claim 8, wherein the machine type information is stored in the discharge control device.

10. The electric circuit arrangement according to claim 1, wherein the at least one energy accumulator is a capacitor.

11. The electric circuit arrangement according to claim 10, wherein the electric circuit arrangement is configured as multi-phase inverter.

12. The electric circuit arrangement according to claim 1, wherein the electric circuit arrangement is included in an electric drive device and is connected to an electric machine.

13. The electric circuit arrangement according to claim 12, wherein the electric circuit arrangement is included in a motor vehicle.

14. The electric circuit arrangement according to claim 1, wherein the electric circuit arrangement is included in an electric drive device.

15. A method of operating an electric circuit arrangement including at least one half bridge having two power switching elements and two driver circuits, and a discharge control circuit that is different from the two driver circuits, wherein the half bridge is connectable in parallel with at least one energy accumulator and each power switching element of the power switching elements has a switchable section with an electric resistance that is adjustable by a control voltage at a control input of the power switching element, the method comprising:

while in a normal operation of the power switching elements, generating, by the driver circuits, the control voltage at the control input of each of the power switching elements; and in at least one discharge operation that discharges the at least one energy accumulator, generating, by the discharge control circuit, a discharge voltage based on a discharge current of the at least one energy accumulator that is being discharged as the control voltage at the control input of at least one of the power switching elements, the discharge voltage placing the at least one of the power switching elements in linear operation, wherein the discharge control circuit comprises at least one discharge control device that, in operation, sets an amplitude of the discharge voltage based on discharge information, wherein the discharge control circuit, in operation, generates discharge voltages of both of the power switching elements, and the discharge control device, in operation, sets, in a freewheel discharge operation, the discharge voltages based on discharge information including two voltage metering values describing respectively a voltage drop across each of the power switching elements, and wherein the voltage drop across a first one of the power switching elements is equal to the voltage drop across a second one of the power switching elements.

* * * * *